SIGNAL SEPARATION SYSTEM FOR COLOR TELEVISION RECEIVER

Filed Sept. 13, 1954 2 Sheets-Sheet 1

INVENTOR.
Jack Avins
BY
ATTORNEY

Oct. 29, 1957 J. AVINS 2,811,580

SIGNAL SEPARATION SYSTEM FOR COLOR TELEVISION RECEIVER

Filed Sept. 13, 1954 2 Sheets-Sheet 2

INVENTOR.
Jack Avins
BY
ATTORNEY 2,811,580

SIGNAL SEPARATION SYSTEM FOR COLOR TELEVISION RECEIVER

Jack Avins, Staten Island, N. Y., assignor to Radio Corporation of America, a corporation of Delaware Application September 13, 1954, Serial No. 455,445

3 Claims. (Cl. 178—5.4)

Figure 1:
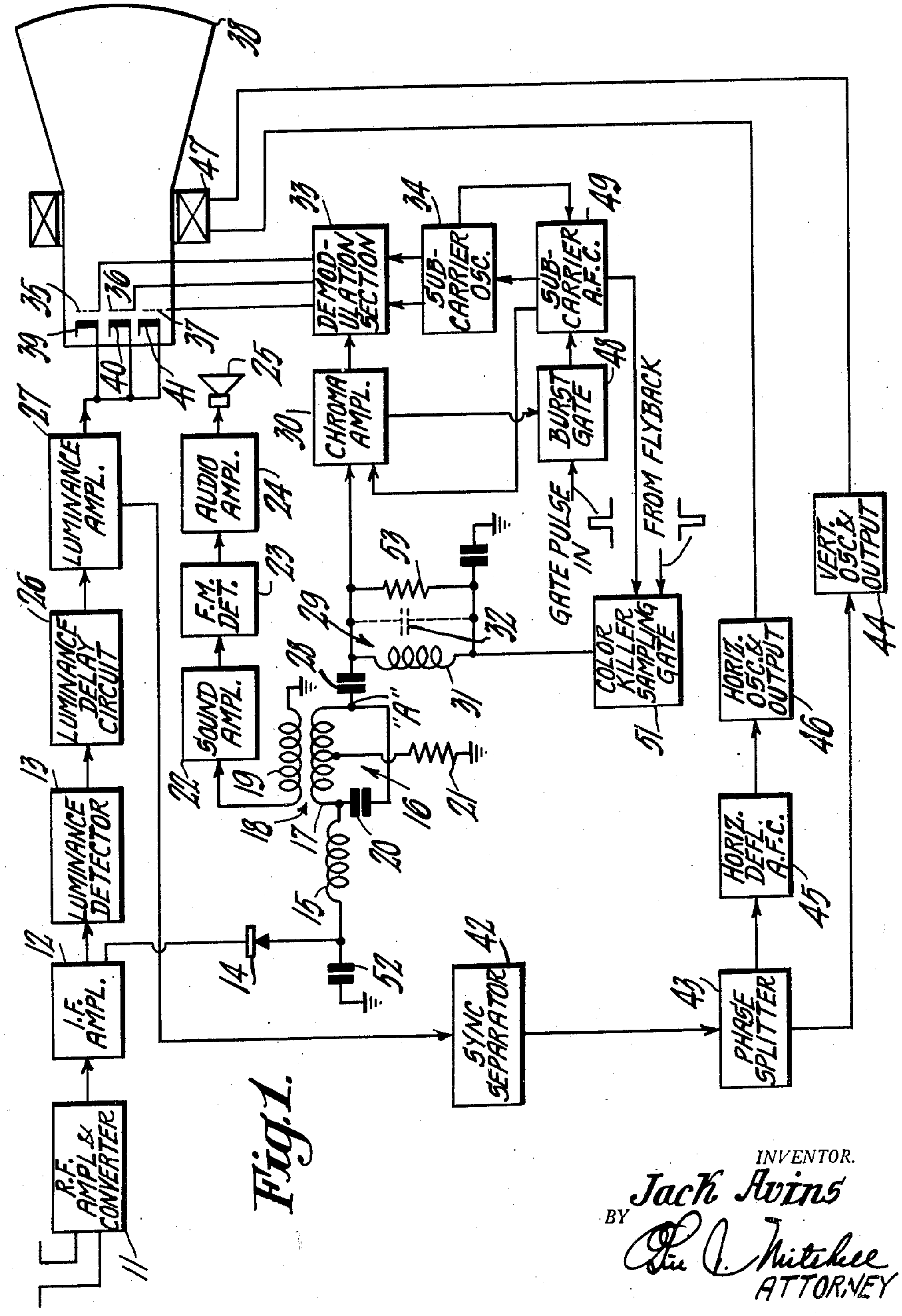

This invention relates to signal detecting systems and more particularly to systems for detecting the sound and picture information of transmitted television signals.

In an intercarrier type of color television receiver such as RCA Model CT–100 described in "Practical Color Television for the Service Industry" published by the RCA Service Company, the sound, luminance, and chrominance signal components are all passed through a common intermediate frequency (I. F.) amplifier section. The sound signal is taken off in the final stage of the I. F. amplifier by means of a conventional amplitude detector, whereas the luminance and chrominance components are both detected by another amplitude detector and then separated from each other by means of appropriate filters.

In one form of the present invention, the luminance signal components are detected by a detector coupled to the I. F. amplifier whereas the sound and chrominance signal components are detected by a separate detector which is also coupled to the I. F. amplifier. Provision is made for separating the sound signal components from the chrominance signal components by a simple coupling circuit involving a trap for preventing the passage of signals of the difference frequencies between the picture carrier and the frequency modulated sound carrier. The trap itself provides a load for the detector of both the sound and chrominance signal components.

In another form of the present invention, a single amplitude detector is coupled to the I. F. channel for detecting the luminance, sound, and chrominance signal components. A trap is used in conjunction with an inductive coupling to take off the sound signal components. Luminance signal components are taken off by a coupling to the trap, and chrominance signal components are removed by other circuits which are also coupled to the trap. The invention is also readily adaptable for use in monochrome television receivers in similar fashion in which case there would be no chrominance circuits coupled to the trap.

It is therefore an object of the present invention to provide a system whereby sound and picture signal components may be separated from television signals in a novel manner.

A principal object of the present invention is to provide an improved system for detecting the intermediate frequency luminance, sound, and chrominance signal components of a composite color video signal and accompanying sound.

Another object of the present invention is to provide a novel system for separating the sound and chrominance signal components from transmitted color television signals.

Still another object of the invention is to provide a system whereby sound and chrominance signal components may be separated from the received color television signals with the additional feature of efficient rejection of an undesired frequency signal.

Another aim of the present invention is to provide a simple and efficient system for removing the chrominance signal components from color television signals, for providing a simple take-off point for the sound signal components, and for preventing the sound signal components from interfering with the removed chrominance signal components.

The invention also may be used in a color television receiver for detecting the sound, luminance, and chrominance signal components of television signals which have been detected by a common detector.

Another aim of the invention is to provide a convenient method of detecting and separating the sound and luminance signal components in intercarrier types of receivers for monochrome television signals.

Figure 2:
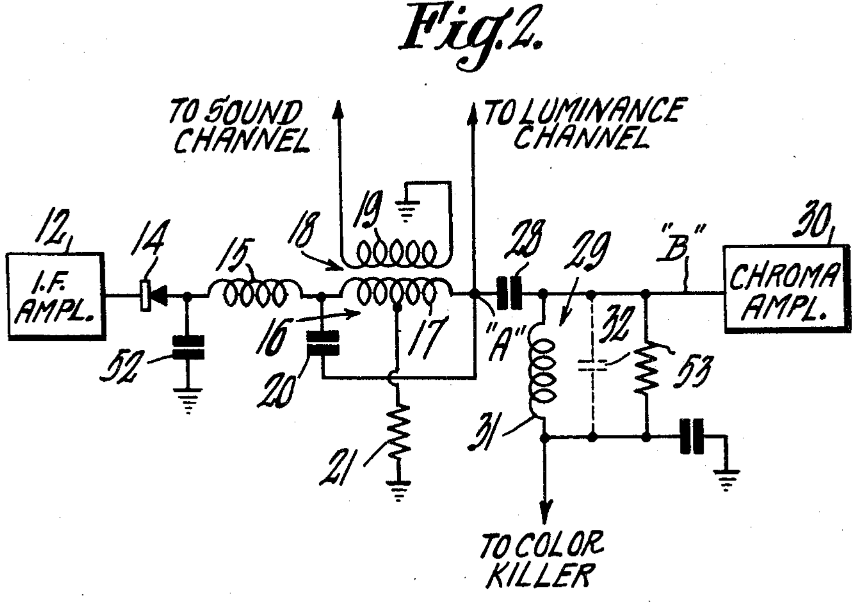

Other objects of the invention as well as an understanding of its operation may be ascertained by referring to the following explanation and to the accompanying drawings in which Figure 1 is a block and schematic diagram showing one form of the present invention, and Figure 2 is a block and schematic diagram of another form of the present invention.

A transmitter color television signal is received and amplified in an R. F. amplifier and converter illustrated by block 11. The incoming signal is heterodyned to produce a modulated intermediate frequency which is applied to I. F. amplifier 12. A portion of the signal output of the I. F. amplifier is applied to a luminance second detector 13 which operates in accordance with conventional amplitude demodulation principles.

Another portion of the signal output of I. F. amplifier 12 is fed to a second detector 14. A coil 15 offers a high impedance to harmonics of the 41.25 mc. intermediate frequency in one illustrative case. A tuned circuit 16 containing a winding 17 of a transformer 18 and a capacitor 20 is tuned to 4.5 mc. The winding 17 is center-tapped and coupled by a resistor 21 to ground. The tuned circuit 16 is known as a "bridged–T" network and it is characterized in that at a point A no 4.5 mc. frequency signal components appear. The resistor 21 is the balancing resistor of the T network which is effective in cancelling out the 4.5 mc. frequency components. A more complete theoretical explanation of the operation of a bridged-T network may be found in F. E. Terman's "Radio Engineers' Handbook" (first edition, McGraw-Hill) at page 918, Figure 23 (*a*). In that figure the capacitive element is effectively tapped at midpoint; in Figure 1 it is the inductive winding 17 which is mid-tapped but the operation is essentially the same.

The resistor 21 is also the load resistor for the detector 14. All signal frequencies in the vicinity of 4.5 mc. introduced into the tuned circuit 16 are coupled to the sound amplifier 22 by means of the winding 19 of transformer 18. A detector 23 coupled to sound amplifier 22 detects the audio frequency signals which are amplified by audio amplifier 24 and applied to a loud speaker 25. Windings 17 and 19 are tightly coupled and the transformer 18 is designed to keep the distributed capacity between the two windings as low as possible.

The chrominance components are coupled via capacitor 28 and the tuned circuit 29 to the input of chroma amplifier 30. The tuned circuit 29 is composed of an inductance 31 and a distributed capacitance 32 (shown in dashed lines). The capacitance 32 represents in part the distributed capacity of the inductance 31, and in part the input capacity of the following first chroma amplifier tube in the chroma amplifier 30. The tuned circuit 29 may be replaced by a double tuned input circuit if desired. In one operating condition the tuned circuit 29 resonates with a center frequency of about 4 mc. The chroma amplifier 30 may be several stagger-tuned stages. The output of the chroma amplifier 30 is applied to a demodulation section 33. A subcarrier oscillator 34 supplies various phases of a subcarrier frequency wave to the demodulation section 33. Color difference signal voltage waves are produced by the demodulation section 33, and applied respectively to the control grids 35, 36 and 37 of a three gun, tri-color kinescope 38, for example. The characteristics of the demodulation section and the circuitry associated therewith are such, because of relatively restricted bandwidth, as to introduce a certain amount of delay in the passage of the chrominance components therethrough. To compensate for this delay, a luminance delay circuit 26 is coupled intermediate luminance detector 13 and luminance amplifier 27. After the luminance components have been delayed they are amplified in luminance amplifier 27 and applied to the cathodes 39, 40 and 41 of the color kinescope 38.

Another portion of the output of luminance amplifier 27 is applied to sync separator 42 whose output is then divided into positively and negatively polarized waves by a phase splitter 43 which insures the proper polarity of input signals to the vertical oscillator and output stage 44 and to the horizontal deflection automatic frequency control (AFC) 45. AFC 45 controls the frequency of the horizontal oscillator and output circuit 46 which is coupled, as is the vertical oscillator and output circuit 44, to the deflection yoke 47.

The tuned circuit 29 also provides a D. C. path to the input of the chroma amplifier 30 in the receiver shown in Figure 1. One particular form of "color killer" is shown. The output of the chroma amplifier 30 is coupled to a burst gate 48 to which a keying or gating pulse is also applied. The gating pulse gates out the burst of the color synchronizing signal which appears on the back porch of the horizontal blanking pulse. This burst in subcarrier AFC 49 is compared in phase with the phase of the subcarrier oscillator 34 to produce an error voltage should the desired mutual relation not exist. This error voltage controls the frequency at which oscillator 34 operates. The error voltage developed in subcarrier AFC 49 is such as to make color killer sampling gate 51 conduct which, with associated circuitry, in turn biases off the chroma amplifier 30. The time constants of this circuit are such as to keep chroma amplifier 30 cut off during the next and successive back porch intervals so that there would be no way of determining whether burst was or was not present during those intervals. Negative pulses from the flyback circuit are therefore supplied to sampling gate 51 during the back porch interval. The sampling gate 51 will have been rendered conductive by the error voltage in the absence of burst so that positive pulses appear at its output which are coupled so as to make the chroma amplifier 30 conduct during the back porch interval. If burst happens to be present in the next back porch interval the AFC 49 biases sampling gate 51 off which in turn allows the chroma amplifier 30 to pass the chrominance signal components.

Figure 2 shows another way in which the invention may be used. Parts similar to those of Figure 1 are similarly numbered. It is possible to dispense entirely with the separate luminance detector 13 shown in Figure 1. In such a case the amplitude detector 14 of Figure 2 would serve to remove the luminance, sound, and chrominance signal components appearing in the output of I. F. amplifier 12. The tuned circuit 16 would again tray out all components in the vicinity of 4.5 mc. which components would chiefly be the sound components removed by winding 19. At point A only luminance and chrominance signal components would appear. It is therefore possible to take the luminance signal components off at this point, as shown, and apply them to a luminance channel (not shown). The tuned circuit 29, as before, would peak at about 4 mc. whereas other tuned circuits coupled to other stages of a stagger-tuned chroma amplifier would peak at other frequencies to give an effective composite pass band sufficient for good color rendition. Of course, other types of chroma amplifiers may alternatively be used.

It is apparent that the invention is useful in monochrome television receivers for detecting and separating the sound and picture signal components. By omitting the coupling condenser 28, tuned circuit 29 and chroma amplifier 30 ready adaptation is accomplished. The winding 19 takes off the sound components and the trap 16 is very effective in preventing sound components from entering the picture channel.

Instead of coupling one end of the winding 19 to ground as shown in Figure 1 a parallel RC network may be inserted intermediate ground and the end of winding 19. This provides self-bias for the sound amplifier 22 in case the receiver is off tune by a great amount.

In one form of the invention the following values of certain of the components of the circuit portion of Figure 1 gave very satisfactory results although they in no way are to be considered as limiting the present invention

| | | |
|---|---|---|
| Coil **15** | mmf | 4.7 |
| Resistor **21** | k | 5.6 |
| Condenser **28** | mmf | 4.7 |
| Condenser **52** | mmf | 6.8 |
| Resistor **53** | k | 22 |

Having thus described the invention, what is claimed is:

1. In a color television receiver having a common intermediate frequency channel for the luminance, chrominance and sound signal components of transmitted color television signals, the combination including first means coupled to said intermediate frequency channel for detecting said luminance signal components, second means coupled to said intermediate frequency channel for detecting both said chrominance and sound signal components, a chrominance signal channel having an input terminal, a sound signal channel having an input terminal, means including a bridged-T network for coupling said chrominance signal channel input terminal to said second detecting means, said bridged-T network providing a trap for the sound signal components detected by said second detecting means to prevent the passage of said sound signal components to said chrominance signal channel input terminal, means coupled to said trap for applying said sound signal components to said sound signal channel input terminal, display means coupled to said first detecting means and to said chrominance signal channel for producing luminous images in response to said luminance and chrominance signal components, and means coupled to said sound signal channel for producing audible sounds in response to the separated sound signal components.

2. In a color television receiver having a common intermediate frequency channel for the luminance, chrominance and sound signal components of color television signals, the combination including first means for detecting said luminance signal components, second means for detecting both said chrominance and sound signal components, said first and second detecting means being coupled to said common intermediate frequency channel, respective signal channels for said luminance, chrominance and sound signal components each having an input terminal, means for coupling the luminance signal channel input terminal to said first detecting means, means including a parallel resonant circuit for coupling said chrominance signal channel input terminal to said second detecting means, said resonant circuit comprising a first inductance and a capacitance, an impedance coupled to the mid-point of said first inductance and to a point of reference potential, means including a second inductance coupled to said first inductance for effectively coupling said sound signal channel input terminal to said second detecting means, said resonant circuit being tuned to provide a sound signal component trap for said chrominance signal channel, and display means coupled to said chrominance signal channel and to said luminance signal channel for producing luminous images in response to said luminance and chrominance signal components.

3. In a color television receiver having a common intermediate frequency channel for the luminance, chrominance and sound signal components of color television signals, said receiver also having a common detector for detecting said chrominance and sound signal components, the combination including a transformer having primary and secondary windings, a capacitance in parallel with said primary winding, an impedance coupled substantially to the mid-point of said primary winding and to a point of reference potential, a chrominance signal utilization circuit, means including said primary winding for coupling said chrominance signal utilization circuit to said common detector, the load resistance of said common detector substantially comprising said impedance, said primary winding, said capacitance and said impedance forming a bridged-T circuit which discriminates against passage of said sound signal components to said chrominance signal utilization circuit and which permits passage of said chrominance signal components thereto, a sound signal utilization circuit, and means including said secondary winding for effectively coupling said sound signal utilization circuit to said common detector.

References Cited in the file of this patent

UNITED STATES PATENTS 2,770,673 Creamer ---------------- Nov. 13, 1956

OTHER REFERENCES

Introduction to Color Television, Admiral Corp., February 1954, pages 17 to 27 and 36.